(12) United States Patent
Hao

(10) Patent No.: US 10,623,447 B1
(45) Date of Patent: Apr. 14, 2020

(54) METHOD FOR TRIGGERING IMS COMMUNICATION BASED ON DATA COMMUNICATION PROTOCOLS

(71) Applicant: Ankang Hongtian Science & Techonology Incorporated Company, Ankang, Shaanxi (CN)

(72) Inventor: Lihong Hao, Shaanxi (CN)

(73) Assignee: Ankang Hongtian Science & Techonology Incorporated Company, Ankang (CN)

( * ) Notice: Subject to any disclaimer, the term of this patent is extended or adjusted under 35 U.S.C. 154(b) by 0 days.

(21) Appl. No.: 16/504,267

(22) Filed: Jul. 6, 2019

(30) Foreign Application Priority Data

May 5, 2019 (CN) .......................... 2019 1 0368853

(51) Int. Cl.
*H04L 29/06* (2006.01)
*H04W 4/80* (2018.01)
*G08B 17/10* (2006.01)

(52) U.S. Cl.
CPC ...... *H04L 65/1016* (2013.01); *H04L 65/1006* (2013.01); *H04W 4/80* (2018.02); *G08B 17/10* (2013.01)

(58) Field of Classification Search
CPC .. H04L 65/1016; H04L 65/1006; H04W 4/80; G08B 17/10
See application file for complete search history.

(56) References Cited

U.S. PATENT DOCUMENTS

| 2002/0177428 A1* | 11/2002 | Menard | G08B 25/001 455/404.1 |
| 2004/0086093 A1* | 5/2004 | Schranz | H04L 12/1895 379/37 |
| 2012/0122418 A1* | 5/2012 | Hicks, III | G08B 25/001 455/404.1 |
| 2017/0180357 A1* | 6/2017 | Ghosh | H04W 4/70 |
| 2018/0144615 A1* | 5/2018 | Kinney | G08B 29/02 |

FOREIGN PATENT DOCUMENTS

| CN | 101159914 B | 12/2010 |
| CN | 102770882 B | 5/2016 |
| CN | 108737340 A | 11/2018 |

* cited by examiner

*Primary Examiner* — Stella L. Woo
(74) *Attorney, Agent, or Firm* — Wayne & Ken, LLC; Tony Hom

(57) ABSTRACT

A method for triggering IMS communication based on a data communication protocol. In a data communication protocol, the various collected sensed data is defined in accordance with regulations specified in the present invention. Connection to a mobile phone, a computer or a hardware device or the like is established by Bluetooth, or by a virtual serial port, or by RS485 or RS232 or the like. If receiving set data matching the data communication protocol, the mobile phone, the computer or the hardware device or the like into which an IMS system client program is embedded automatically triggers the embedded IMS system client program to communicate through an IMS system. Different telecommunication numbers are triggered by different data. The data between the mobile phone, the computer or the hardware device and the data communication protocol is in a SIP-MESSAGE format.

10 Claims, 1 Drawing Sheet

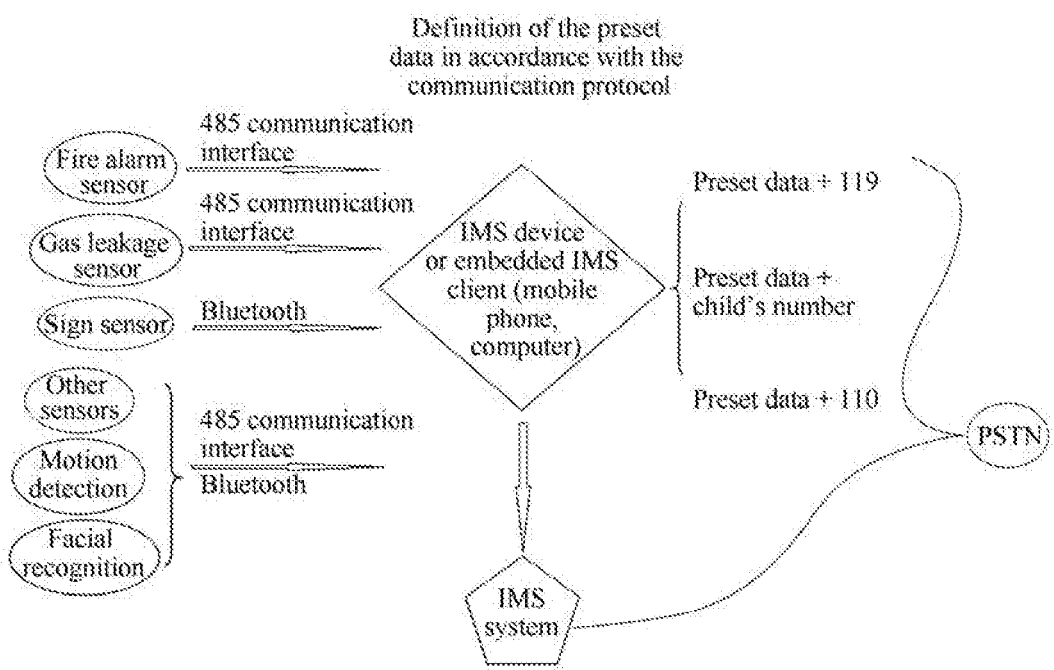

METHOD FOR TRIGGERING IMS COMMUNICATION BASED ON DATA COMMUNICATION PROTOCOLS

CROSS-REFERENCE TO RELATED APPLICATIONS

This application claims the benefit of priority from Chinese Patent Application No. CN201910368853.3, filed on May 5, 2019. The content of the aforementioned application, including any intervening amendments thereto, is incorporated herein by reference in its entirety.

TECHNICAL FIELD

The present invention relates to IoT, and more specifically to a method for triggering IMS communication based on a data communication protocol.

BACKGROUND OF THE PRESENT INVENTION

At present, techniques such as motion detection and facial recognition, which are based on IoT, develop rapidly. However, in practice, there are so many environments and conditions to be distinguished and recognized. For example, in the same environment, there are different types of data such as fire alarm, water level, rainfall, temperature and humidity to be recognized; and when recognizing the same type of data under different environments, persons and objects in the different environments also need to be distinguished. Meanwhile, the application of techniques such as motion detection and facial recognition is somewhat limited by network performance and usage scenarios. For example, motion detection is applied only in detection of moving objects and then triggering of communicative connection. Such motion detection technique cannot meet the demands for intelligently determining many conditions and automatically connecting to different communication objects under different conditions. Moreover, such motion detection does not support some basic functions such as call forwarding busy. So does the facial recognition.

SUMMARY OF THE PRESENT INVENTION

A technical problem to be solved in the present invention is to provide a method for triggering IMS communication based on a data communication protocol, by which scene recognition is performed based on sensors, IMS communication is triggered by a data communication protocol, and different IMS numbers are triggered by different conditional data. The present invention provides a novel solution for the intelligent development of IoT.

A method for triggering IMS communication based on a data communication protocol is provided, comprising:

providing a plurality of sensors and an IMS communication terminal in a scene recognition environment, with a data communication protocol being set between the sensors and the IMS communication terminal, the sensors sending the detected data to the IMS communication terminal by a signal conversion module; and when the IMS communication terminal receives data matching with the data communication protocol, which is sent by the sensors, triggering the IMS communication terminal to establish a communication to a set telecommunication number by an IMS system.

In the data communication protocol, the sensed data collected by the sensors is converted, by a signal conversion module, in accordance with hexadecimal notation and a connection mode to the IMS communication terminal, into a format that is recognized by the IMS communication terminal; and the IMS communication terminal is in wired connection to the signal conversion module by a virtual serial port or by an RS485 or RS232 serial port, and the IMS communication terminal communicates with the signal conversion module in accordance with the hexadecimal notation on which an agreement they reach, specifically:

header/type/MAC0-MAC3/operating state/sensor data/CRC_H/CRC_L;

wherein, "operating state" and CRC_H are data collected by the sensors, it is indicated that no data is collected if both are 0, and data is expressed, if collected, in hexadecimal format; if the data is matching the data preset in the IMS communication terminal, the IMS communication terminal is automatically triggered to perform communication; and the signal conversion module converts, in accordance with hex-to-text conversion, the data collected by the sensors into data in text format, which can be recognized by the IMS communication terminal.

The sensors are communicatively connected to the IMS communication terminal in a wired or wireless mode.

Wired communication: the sensors are communicatively connected to the IMS communication terminal via the RS485 or RS232 serial port; and Wireless communication: the sensors are communicatively connected to the IMS communication terminal via Bluetooth.

The IMS communication terminal is a communication device on which an IMS system client is loaded.

The data communication protocol between the IMS communication terminal and the sensors specifies that:

if the data, sent by the sensors, received by the IMS communication terminal is consistent in format with the data in a setting list in the IMS system, it is determined as matched;

if the data, sent by the sensors, received by the IMS communication terminal is not consistent in format with the data in the setting list in the IMS system, it is determined as unmatched; and the data in the setting list is in hex-to-text format.

Triggering different telecommunication numbers by different data includes: according to the types of sensors, numbers to be triggered by the data from the sensors are set and saved in the IMS system; and when the IMS communication terminal receives data matching the data communication protocol, the data triggers the IMS system to call the set number by a video call.

If communication is triggered in a scene where no person is found, a calling party responds according to the remote video.

If communication is triggered in a scene where a person is found, the calling party and a called party respond by establishing bidirectional communication.

The data between the IMS system and the data communication protocol is in a SIP-MESSAGE format.

The sensors for collecting data in the data communication protocol include sensors configured to collect gas leakage, fire alarm, electric leakage, water level, rainfall, temperature, humidity, body temperature and heart rate.

In order to obtain a uniform interface to the IMS device, different sensors or the collected conditional data are set in terms of baud rate, parity check bit and stop bit.

The data collected by the sensors are set in hexadecimal format, the baud rate is set as 9600, the parity check bit is set as no parity, and the stop bit is set as 8 bits.

The collected body temperature and heart rate are processed as follows:

the sensors send, to the IMS communication terminal, an uplink request data frame, to establish a request for sending the data;

the sensors send, to the IMS communication terminal, an uplink connection data frame, to establish a communication protocol in order to trigger IMS communication; and the IMS communication terminal sends, to the sensors, a downlink response data frame to respond the IMS communication when the communication protocol is matched.

Compared with the prior art, the present invention has the following beneficial effects.

The present invention presents scene recognition and provides a novel solution for the intelligent development of IoT; and communicating based on the IMS system integrates voice, video and data.

In the present application, the scene recognition is performed by collecting the gas leakage, fire alarm, electric leakage, water level, rainfall, temperature, humidity and the like by sensors, determining a moving object by motion detection and converting the results into specific data, determining a target subject by facial recognition and converting the results into specific data, triggering IMS communication by the obtained scene data, and triggering different IMS numbers by different conditional data. The present invention provides a novel solution for the intelligent development of IoT.

BRIEF DESCRIPTION OF THE DRAWINGS

FIG. 1 is a flowchart of communication according to the present invention.

DETAILED DESCRIPTION OF THE PRESENT INVENTION

The present invention will be further described below with reference to the accompanying drawings. The description is merely provided for explaining the present invention, rather than limiting the present invention.

Referring to FIG. 1, the present invention provides a method for triggering IMS communication based on a data communication protocol as will be described below.

1) Data from the sensors, motion detection and facial recognition is defined in the data communication protocol.

2) If receiving the set data matching the data communication protocol, the mobile phone, the computer or the hardware device or the like automatically triggers the embedded IMS system client program to communicate through the IMS system. Different telecommunication numbers are triggered by different data. For example, if receiving data matching facial recognition, the mobile phone, the computer or the hardware device automatically triggers a specified number to communicate through the IMS system.

3) In the data communication protocol, the collected various sensed data is defined in accordance with regulations. Connection to the mobile phone, the computer or the hardware device or the like is established by Bluetooth or WIFI.

4) The data between the mobile phone, the computer or the hardware device and the data communication protocol is in the SIP-MESSAGE format.

The IMS software is triggered to perform communication, in accordance with regulations specified in the present invention.

For example, the sensor devices are connected to the IMS communication terminal by Bluetooth. In accordance with regulations specified in the present invention, the data collected by the fire alarm sensor is B1 A0 C0 B0 00 11 (data collected by different sensors are in special format, but the communication interface is usually TTL\RS232\485; and DCU mainly functions to uniformly define the data collected by different sensors in accordance with the hexadecimal notation and communicates with the IMS communication terminal according to the communication protocol). By this data, the IMS software is automatically triggered to make a video call to 119.

The determination by motion detection (big-data computation) is as follows: a connection to the IMS device is established by a data interface of a back-end server, and IMS communication is triggered in accordance with regulations specified in the present invention simply by using the recognized critical image as a trigger condition.

In a scene where no person is found (with smoke or in the case of fire), remote video communication is established with the telecommunication number so that response can be made in time. For example, according to the situation shown in the video, the command center directs people evacuation by broadcasting to the fire region or remotely manipulates the access control equipment to reduce personnel and property losses.

In a scene where a person is found (suffering from physical discomfort), remote video connection is established by automatically making a call to the community hospital by its telecommunication number, so that corresponding rescue measures can be taken by bidirectional interaction.

In the present invention, IMS communication is triggered based on the data communication protocol. In the data communication protocol, the collected (by collecting the gas leakage, fire alarm, electric leakage, water level, rainfall, temperature, humidity and the like by sensors, determining a moving object by motion detection and converting into specific data, determining a target subject by facial recognition and converting into specific data) various sensed data is defined in accordance with regulations specified in the present invention. Different sensors or collected conditional data are defined in terms of baud rate, parity check bit and stop bit. The collection of data such as body temperature and heart rate will be described as an example.

TABLE 1

| Definition of the uplink request data frame | | | | | | | | | |
|---|---|---|---|---|---|---|---|---|---|
| Device NO. 001 | Group 0001 | Type 0001 | Number of terminals 0003 | | | | | | |
| Terminal ID A001 | Operating state 0 | BT 0000 | HR 000 | Longitude | Latitude | SB | SB | SB | SB |

TABLE 1-continued

Definition of the uplink request data frame

| Device NO. 001 | Group 0001 | Type 0001 | Number of terminals 0003 | | | | | | | |
|---|---|---|---|---|---|---|---|---|---|---|
| Terminal ID A002 | Operating state 0 | BT 0000 | HR 000 | Longitude | Latitude | SB | SB | SB | SB | |
| Terminal ID A003 | Operating state 0 | BT 0000 | HR 000 | Longitude | Latitude | SB | SB | SB | SB | |
| Terminal ID A004 | Operating state 0 | BT 0000 | Heart rate 000 | Longitude | Latitude | SB | SB | SB | SB | |

*BT: body temperature; HR: heart rate; SB: standby.

TABLE 2

Definition of the downlink response data frame

| Device NO. | Group | Type | Number of terminals |
|---|---|---|---|
| 001 | 0001 | 0001 | 0003 |

TABLE 3

Definition of the uplink connection data frame

| FH | Type | MAC 0 | MAC 1 | MAC 2 | MAC 3 | Operating state | BT | HR | Longitude | Latitude | SB | SB | CRC H | CRC L |
|---|---|---|---|---|---|---|---|---|---|---|---|---|---|---|
| 0x7F | 0X01 | | | | | | | | | | | | — | — |

*FH: frame header; BT: body temperature; HR: heart rate; SB: standby.

If the body temperature collected by a body temperature sensor is 38° C., in accordance with regulations specified in the present invention, the data is expressed as 00 10 00 A0 01 38, which is matching the trigger data preset for the IMS software. In this case, the IMS software automatically makes a video call to 120.

The sensors collect other conditional data, and establish, in accordance with the data communication protocol, connection to the mobile phone, the computer or the hardware device by Bluetooth or WIFI or other data interfaces. If receiving set data matching the data communication protocol, the mobile phone, the computer or the hardware device or the like automatically triggers the embedded IMS system client program to communicate through an IMS system. Different telecommunication numbers are triggered by different data. The data between the mobile phone, the computer or the hardware device and the data communication protocol is in a SIP-MESSAGE format. If receiving other data in the data communication protocol out of a set range, the mobile phone, the computer or the hardware device or the like interacts and responds by an interaction program embedded in the mobile phone, the computer or the hardware device or the like. Connection to the mobile phone, the computer or the hardware device or the like is established by Bluetooth or WIFI or the like.

If receiving the set data matching the data communication protocol, the mobile phone, the computer or the hardware device or the like is automatically triggered to communicate through an IMS system embedded in the mobile phone, the computer or the hardware device. The IMS system client program embedded in the mobile phone, the computer or the hardware device is triggered in the case of matched data, upon receiving the data in format preset in accordance with the communication protocol. For example, there is no data from the fire alarm sensor in normal situations. In the case of fire, data matching the communication protocol is sent and the IMS system client program embedded in the mobile phone, the computer or the hardware device automatically makes a video call to 119 by the IMS system upon receiving the reconstructed data. The triggering depends upon the preset alarm data; and if the received data matches the preset data, a call to a corresponding number is made by IMS.

Different telecommunication numbers are triggered by different data (in the case of fire, a video call is made to 119; and in the case of gas leakage, a video call is made to the property management center by its hot line). The data between the mobile phone, the computer or the hardware device and the data communication protocol is in a SIP-MESSAGE format (an international standard message format, supporting only text messages, not pictures, videos, files or the like).

The family scene recognition will be described as an example. Data to be collected for the purpose of intelligent operation includes ammeter reading, water meter reading, gas leakage, fire alarm, electric leakage, signs of the old, or the like. At present, it is done by multiple systems, multiple collection methods and multiple communicative connection methods.

In the present invention, connection to the IMS communication terminal may be established by a 485 interface, or by a DCU, connection to a TV set, into which the IMS client program is embedded may be established by Bluetooth. The trigger data may be preset according to the data communication protocol.

When the old has a heart rate higher than or lower than a normal value, the IMS communication terminal automatically triggers his/her child's IMS client to establish remote video communication, so that his/her child can respond in time.

In the case of gas leakage, a call is automatically made to the property management center by its hot line, for the purpose of communication by IMS, so that the property management center can take emergency measures and provide on-site service.

Based on the data communication protocol and by IMS communication, the fragmentized collection and application of data is solved. Furthermore, the IMS communication integrates voice, video and data fusion. It achieves both connectivity and efficient communication.

The above embodiments are only some preferred embodiments of the present invention, but are not intended to limit the present invention. Any unsubstantial addition and replacement made by a person of ordinary skill in the art based on the technical features of the present invention shall fall within the scope of the present invention.

What is claimed is:

1. A method for triggering IMS communication based on a data communication protocol, comprising:
    providing a plurality of sensors and an IMS communication terminal in a scene recognition environment, with a data communication protocol being set between the sensors and the IMS communication terminal, the sensors sending the detected data to the IMS communication terminal by a signal conversion module; and
    when the IMS communication terminal receives data matching the data communication protocol sent by the sensors, triggering the IMS communication terminal to establish a connection to a set telecommunication number by an IMS system;
    wherein in the data communication protocol, the sensed data collected by the sensors is converted, by the signal conversion module, in accordance with a hexadecimal notation and a connection mode to the IMS communication terminal, into a format that is recognized by the IMS communication terminal; and
    the IMS communication terminal is in wired connection to the signal conversion module by a virtual serial port or by an RS485 or RS232 serial port, and the IMS communication terminal communicates with the signal conversion module in accordance with the hexadecimal notation on which an agreement they reach, specifically:
    header/type/MAC0-MAC3/operating state/sensor data/CRC_H/CRC_L;
    wherein, "operating state" and CRC_H are data collected by the sensors, it is indicated that no data is collected if both are 0, and data is expressed, if collected, in hexadecimal format; if the data is matching the data preset in the IMS communication terminal, the IMS communication terminal is automatically triggered to perform communication; and the signal conversion module converts, in accordance with hex-to-text conversion format, the data collected by the sensors into data in text format, which can be recognized by the IMS communication terminal.

2. The method of claim 1, wherein the sensors are communicatively connected to the IMS communication terminal in a wired or wireless communication way:
    for the wired communication way: the sensors are communicatively connected to the IMS communication terminal by the RS485 or RS232 serial port;
    for the wireless communication way: the sensors are communicatively connected to the IMS communication terminal by Bluetooth; and
    the IMS communication terminal is a communication device on which an IMS system client is loaded.

3. The method of claim 1, wherein the data communication protocol between the IMS communication terminal and the sensors specifies that:
    it is determined as matched, if the data, sent by the sensors, received by the IMS communication terminal is consistent in format with the data in a setting list in the IMS system;
    it is determined as unmatched, if the data, sent by the sensors, received by the IMS communication terminal is not consistent in format with the data in the setting list in the IMS system; and
    the data in the setting list is in hex-to-text format.

4. The method of claim 1, wherein triggering different telecommunication numbers by different data comprises:
    according to types of sensors, numbers to be triggered by the data from the sensors are set and saved in the IMS system; and when the IMS communication terminal receives data matching the data communication protocol, the data triggers the IMS system to call the set number by a video call.

5. The method of claim 4, wherein, if communication is triggered in a scene where no person is found, the calling party responds according to a remote video; and
    if communication is triggered in a scene where a person is found, the calling party and the called party respond by establishing bidirectional communication.

6. The method of claim 1, wherein the data between the IMS system and the data communication protocol is in a SIP-MESSAGE format.

7. The method of claim 1, wherein the sensors for collecting data in the data communication protocol comprise sensors configured to collect the gas leakage, fire alarm, electric leakage, water level, rainfall, temperature, humidity, body temperature and heart rate.

8. The method of claim 1, wherein, in order to obtain a uniform interface to the IMS device, different sensors or collected conditional data are set in terms of baud rate, parity check bit and stop bit:
    the data collected by the sensors are set in hexadecimal format, the baud rate is set as 9600, the parity check bit is set as no parity, and the stop bit is set as 8 bits.

9. The method of claim 7, wherein, in order to obtain a uniform interface to the IMS device, different sensors or collected conditional data are set in terms of baud rate, parity check bit and stop bit:
    the data collected by the sensors are set in hexadecimal format, the baud rate is set as 9600, the parity check bit is set as no parity, and the stop bit is set as 8 bits.

10. The method of claim 7, wherein the collected body temperature and heart rate are processed as follows:
    the sensors send, to the IMS communication terminal, an uplink request data frame, to establish a request for sending the data;
    the sensors send, to the IMS communication terminal, an uplink connection data frame, to establish a communication protocol in order to trigger IMS communication; and
    the IMS communication terminal sends, to the sensors, a downlink response data frame to perform an IMS communication response when the communication protocol is matched.

* * * * *